United States Patent
Xu et al.

(10) Patent No.: US 9,445,471 B2
(45) Date of Patent: Sep. 13, 2016

(54) DRIVE CIRCUIT FOR LED MODULE

(71) Applicant: SHANGHAI YAMING LIGHTING CO., LTD., Shanghai (CN)

(72) Inventors: Xiaoliang Xu, Shanghai (CN); Baoquan Li, Shanghai (CN); Carnotensis Ludo, Shanghai (CN); Krijger De Sjef, Shanghai (CN)

(73) Assignee: SHANGHAI YAMING LIGHTING CO., LTD., Jiading District, Shanghai (CN)

( * ) Notice: Subject to any disclaimer, the term of this patent is extended or adjusted under 35 U.S.C. 154(b) by 0 days.

(21) Appl. No.: 14/416,854

(22) PCT Filed: Sep. 26, 2012

(86) PCT No.: PCT/CN2012/081998
§ 371 (c)(1),
(2) Date: Jan. 23, 2015

(87) PCT Pub. No.: WO2014/015560
PCT Pub. Date: Jan. 30, 2014

(65) Prior Publication Data
US 2015/0208475 A1    Jul. 23, 2015

(30) Foreign Application Priority Data
Jul. 24, 2012 (CN) .......................... 2012 1 0258384

(51) Int. Cl.
*H05B 33/08* (2006.01)
*F21V 23/04* (2006.01)

(52) U.S. Cl.
CPC ....... *H05B 33/0827* (2013.01); *F21V 23/0457* (2013.01); *H05B 33/083* (2013.01); *H05B 33/0815* (2013.01); *H05B 33/0824* (2013.01); *Y02B 20/346* (2013.01)

(58) Field of Classification Search
CPC .............. F21V 23/00; F21V 23/0457; H05B 33/0815; H05B 33/0824; H05B 33/0827; H05B 33/083
See application file for complete search history.

(56) References Cited

U.S. PATENT DOCUMENTS

| 8,471,495 B2* | 6/2013 | Muguruma | H05B 33/083 315/185 R |
| 2006/0244396 A1* | 11/2006 | Bucur | H05B 33/083 315/312 |
| 2007/0108843 A1* | 5/2007 | Preston | H05B 33/083 307/112 |
| 2007/0257623 A1* | 11/2007 | Johnson | H05B 33/0818 315/193 |
| 2008/0094000 A1* | 4/2008 | Yamamoto | H05B 33/0803 315/250 |

(Continued)

*Primary Examiner* — Jason M Crawford
*Assistant Examiner* — Kurtis R Bahr
(74) *Attorney, Agent, or Firm* — Global IP Services; Tianhua Gu

(57) ABSTRACT

The present invention relates to a drive circuit of an light-emitting diode (LED) module, which includes: an LED array including a plurality of parallel groups connected in series; a power supply module for converting an external power supply into a 12V-75V forward voltage that drives each LED in the LED array; and a control module for controlling different gating switches to perform a conduction or cutoff operation according to a detected input voltage. The solution in accordance with the present invention can provide regular AC power for the LED array, without the need of providing an electrolytic capacitor. The present invention further overcomes design defects of a DC solution, optimizes the performance of a bulb, and reduces a manufacturing cost of the bulb. Compared with other lighting technologies, the AC solution reduces a total arrangement cost of the LED.

6 Claims, 3 Drawing Sheets

(56) References Cited

U.S. PATENT DOCUMENTS

| | | | |
|---|---|---|---|
| 2008/0290814 A1* | 11/2008 | Leong | F21K 9/00 315/294 |
| 2010/0134018 A1* | 6/2010 | Tziony | H05B 33/083 315/122 |
| 2010/0231135 A1* | 9/2010 | Hum | H05B 33/0815 315/250 |
| 2011/0248640 A1* | 10/2011 | Welten | H05B 33/083 315/210 |
| 2011/0273102 A1* | 11/2011 | van de Ven | H05B 33/0809 315/193 |
| 2012/0038284 A1* | 2/2012 | Setomoto | H05B 33/0827 315/192 |
| 2012/0081004 A1* | 4/2012 | Wilmoth | H05B 33/0803 315/51 |

* cited by examiner

DRIVE CIRCUIT FOR LED MODULE

CROSS REFERENCE TO RELATED PATENT APPLICATION

The present application is the US national stage of PCT/CN2012/081998 filed on Sep. 26, 2012, which claims the priorities of the Chinese patent applications No. 201210258384.8 filed on Jul. 24, 2012, which applications are incorporated herein by reference.

BACKGROUND OF THE PRESENT INVENTION

1. Field of Invention

The present invention relates to the field of light-emitting diode (LED) lighting, and specifically to a drive circuit of an LED module.

2. Description of Related Arts

At present, light sources for street lighting include an incandescent lamp, a high pressure mercury lamp, a high pressure sodium lamp, a metal halide lamp, a fluorescent lamp, and the like. These street lamps generally have the following disadvantages: they are less environmentally friendly (mercury, lead, arsenic and other heavy metals contained therein are harmful to the environment), have high energy consumption and a short service life. Therefore, with the enhancement of global environmental protection consciousness, in countries throughout the world, especially in developed countries and regions, environmentally friendly lighting is more widely applied, and an environmentally-friendly light source will gradually substitute for these street lamps. An LED module with a 3-5V forward voltage is an environmentally friendly light source that has high efficiency, saves energy, and has a long luminescence lifetime, which is of great significance to environmental protection, energy saving, and protection of human health.

As known in the industry, adjustment of the brightness of the LED module with a 3-5V forward voltage is implemented by adjusting a current flowing through an LED, and therefore a brightness control for the LED is usually implemented by controlling an output current of an LED drive circuit. At present, in the field of LED drivers with a 3-5V forward voltage, products vary in quality. In order to reduce a cost, some products are provided with a simple line, have a power factor merely reaching about 0.5, and incur low luminous efficiency, thereby failing to meet a demand for efficient and energy-saving products in market; and in order to meet a high performance requirement, some products have a very complicated circuit. Refer to FIG. 1, which is a schematic diagram of a principle of a drive circuit of a conventional LED module with a 3-5V forward voltage. As shown in FIG. 1, a conventional LED drive power supply includes an electromagnetic interference (EMI) unit 121, an analog/digital (A/D) conversion unit 122, an input and output isolation unit 123, constant-voltage and constant-current output and overvoltage and overcurrent (an open circuit and a short circuit) protection unit 124, and a power factor correction (PFC) power supply 125, and the like. Because a large number of restrictive devices such as electrolytic capacitors and inductors are used in the above drive circuit, a line is rather complicated, it is difficult to lay a simple line, and the cost is greatly increased; furthermore, specific circuits of different products are also different and it is also highly difficult to develop a circuit, which increase development time; and because a part of the line of the drive power supply is complicated, a manufactured LED lamp is relatively large in size, which seriously affects an overall design of a lamp product and application flexibility thereof.

Among current LED lighting solutions, a direct current (DC) driving solution makes a manufacturing cost of LED lamps remain high all the time, because some elements are added in a multistage power conversion process; and in addition, an alternating current (AC) solution using discrete elements such as a resistor and a linear regulator reduces the cost, but incurs lower efficiency and a lower power factor. Therefore, how to provide a drive circuit of an LED module that supports AC direct input by using a high voltage solution and omits some elements that must be equipped in a DC solution is a problem to be solved urgently by practitioners in the art.

SUMMARY OF THE PRESENT INVENTION

In view of the foregoing disadvantages in the prior art, an object of the present invention is to provide a drive circuit of an LED module, which is used to solve problems in a drive circuit of the prior art that, due to a large number of used restrictive devices such as electrolytic capacitors and inductors, a line is complicated and efficiency and a power factor are low.

In order to achieve the above object and other related objects, the present invention provides a drive circuit of an LED module, where the drive circuit at least comprises: an LED array, comprising a plurality of parallel groups formed by a plurality of LEDs connected in parallel, where the parallel groups are connected in series; a power supply module, connected to an external AC or DC power supply and the LED array, and used for converting the external power supply into a 12V-75V forward voltage that drives each LED in the LED array; and a control module, connected between the power supply module and the LED array, and comprising a plurality of gating switches and a control unit, where the gating switches are disposed corresponding to the parallel groups and used for conducting or cutting off power supply loops of the parallel groups, and the control unit is used for controlling the gating switches to perform a conduction or cutoff operation according to a detected input voltage.

Preferably, power of each LED in the LED array is 1 W-4 W.

Preferably, the power supply module is connected to both ends of the AC power supply, and comprises a DB bridge, a varistor, a transient voltage suppressor (TVS) diode, and a capacitor, wherein, a first end and a second end of the DB bridge are respectively connected to a null wire of the AC power supply and a live wire of the AC power supply, a third end of the DB bridge is grounded, and a fourth end is connected to the LED array and the control module; the varistor is connected between the first end and the second end of the DB bridge; the TVS diode is connected between the third end and the fourth end of the DB bridge; and the capacitor is connected between the third end and the fourth end of the DB bridge.

Preferably, the AC power supply connected to the power supply module is a 220V AC power supply, a 230V AC power supply, a 277V AC power supply, or a 110V AC power supply.

Preferably, the LED array comprises a first parallel group, a second parallel group, a third parallel group and a fourth parallel group that are successively connected in series.

Preferably, a first gating switch, a second gating switch, a third gating switch and a fourth gating switch corresponding to the first parallel group, the second parallel group, the third parallel group and the fourth parallel group are disposed in the control module.

Preferably, the control module further comprises: a setting unit, used for presetting a first voltage threshold, a second voltage threshold, a third voltage threshold and a fourth voltage threshold; and a detection unit, connected to the power supply module, and used for detecting a value of a forward voltage outputted by the power supply module, sending an instruction to the control unit to instruct the control unit to control the first gating switch to be turned on, when detecting that the value of the forward voltage reaches the first voltage threshold; sending an instruction to the control unit to instruct the control unit to control the first gating switch and the second gating switch to be turned on, when detecting that the value of the forward voltage reaches the second voltage threshold; sending an instruction to the control unit to instruct the control unit to control the first gating switch, the second gating switch and the third gating switch to be turned on, when detecting that the value of the forward voltage reaches the third voltage threshold; and sending an instruction to the control unit to instruct the control unit to control the first gating switch, the second gating switch, the third gating switch and the fourth gating switch to be turned on.

As described above, the drive circuit of the LED module in accordance with the present invention has the following beneficial effects: A line voltage of an LED can synchronize with an input voltage of a power supply, and when a switch controls the LED to be turned on or turned off, a current reference value of the LED also correspondingly changes as the voltage of the power supply changes. In this way, two effects are achieved: low power consumption (because a small voltage difference exists between two different LEDs) and a large power factor (the current follows the voltage) are obtained; and furthermore, each LED in the LEDs connected in parallel can evenly shunt the current flowing through them and this method can substantially improve the luminous efficiency. The solution in accordance with the present invention can provide regular AC power for the LED array, without the need of providing an electrolytic capacitor. The solution further overcomes design defects of a DC solution, optimizes the performance of a light bulb, and reduces a manufacturing cost of the light bulb. Compared with other lighting technologies, the AC solution reduces a total arrangement cost of the LED.

ILLUSTRATION OF ELEMENT LABELS

Figure 1:
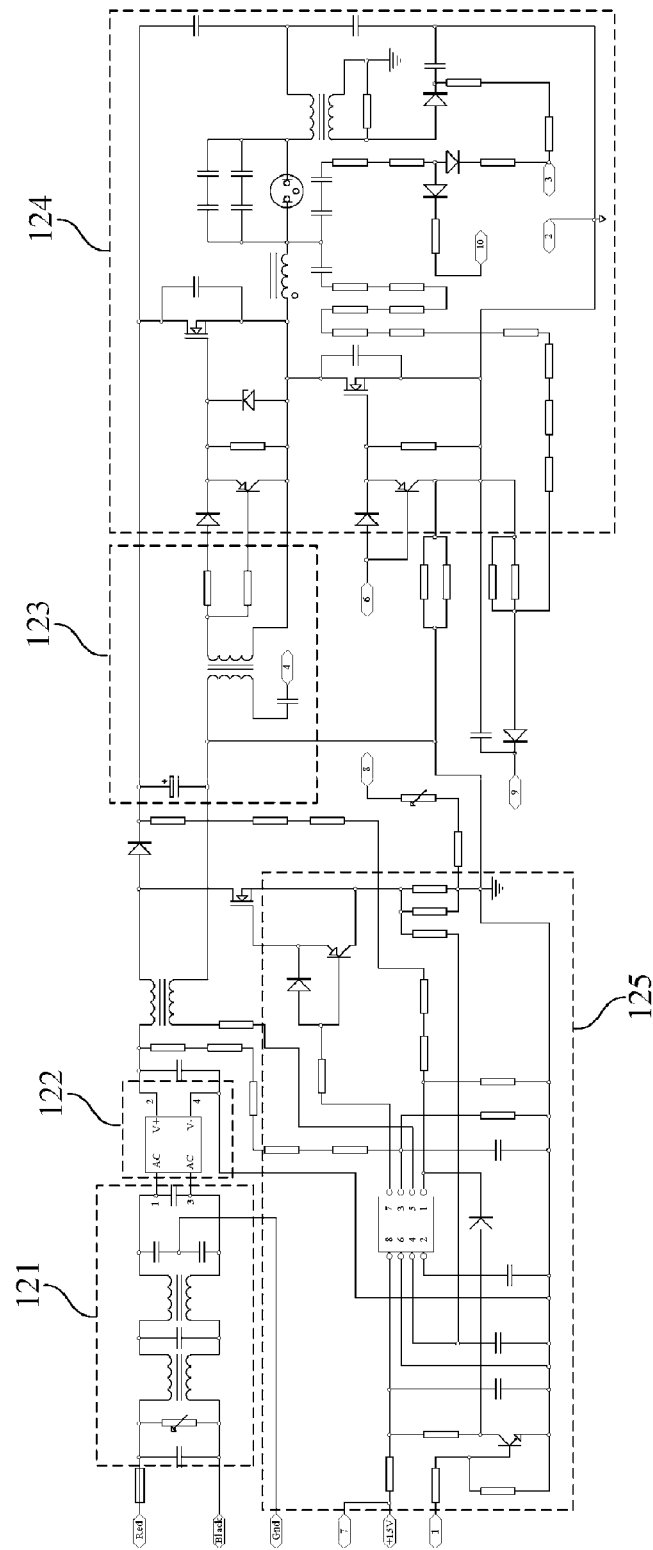
FIG. 1 is a schematic diagram of a principle of a drive circuit of a conventional LED module with a 3-5V forward voltage.

121 EMI unit
122 A/D conversion unit
123 input and output isolation unit
124 protection unit
21 LED array
211 a first parallel group
212 a second parallel group
213 a third parallel group
214 a fourth parallel group
22 power supply module
23 control module
231 control unit
232 setting unit
233 detection unit
DB1 DB bridge
R14 varistor
TVS TVS diode
C capacitor

DETAILED DESCRIPTION OF THE PREFERRED EMBODIMENTS

Embodiments of the present invention are described below by means of specific examples. Persons skilled in the art may easily understand other advantages and effects of the present invention according to the disclosure of this description. The present invention may also be implemented or applied in other different specific implementation manners, and various modifications and variations may also be made to details in the specification on the basis of different opinions and applications, without departing from the spirits of the present invention.

Figure 2:
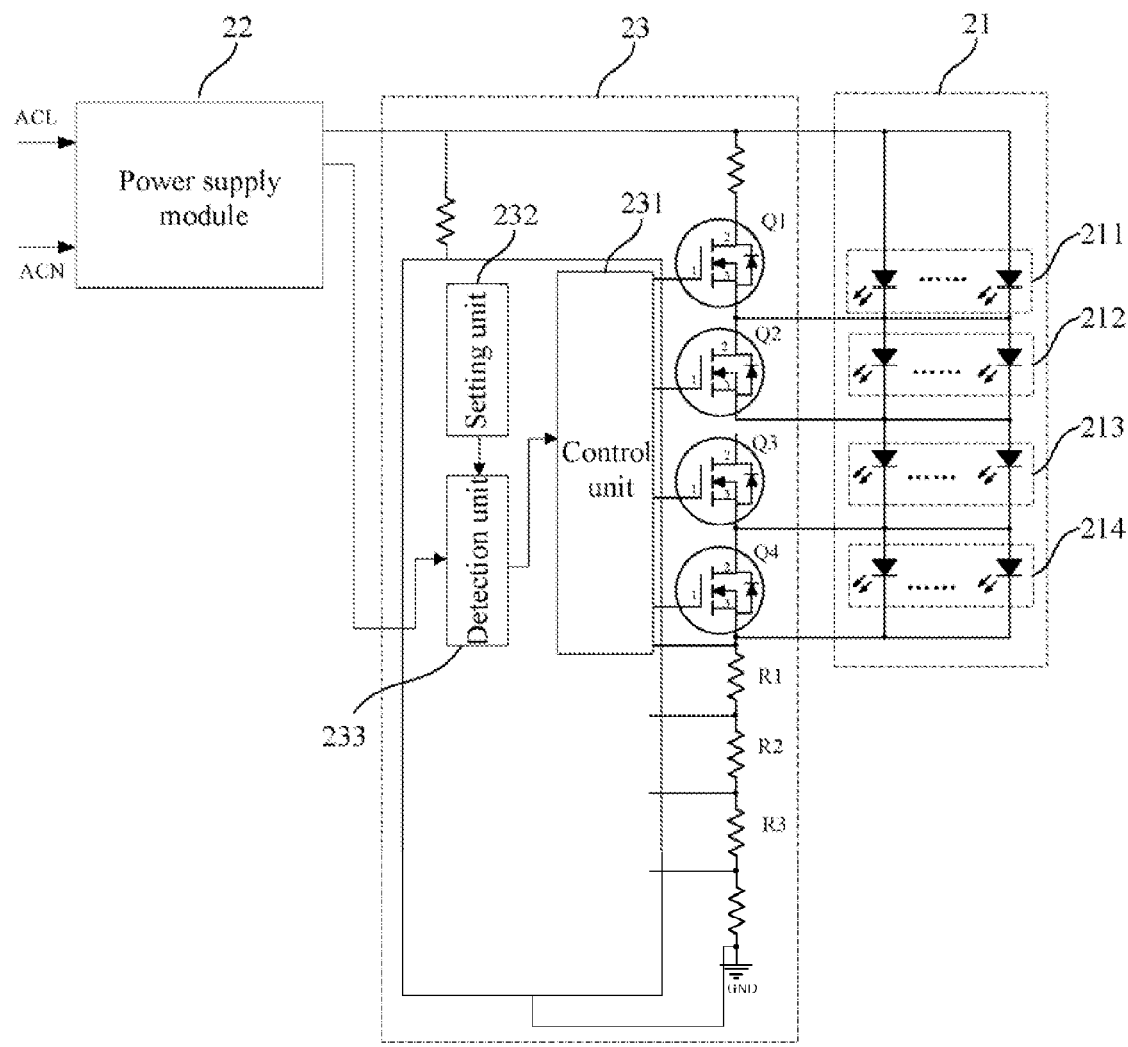
FIG. 2 is a schematic diagram of a principle of a drive circuit of an LED module in accordance with the present invention.
Figure 3:
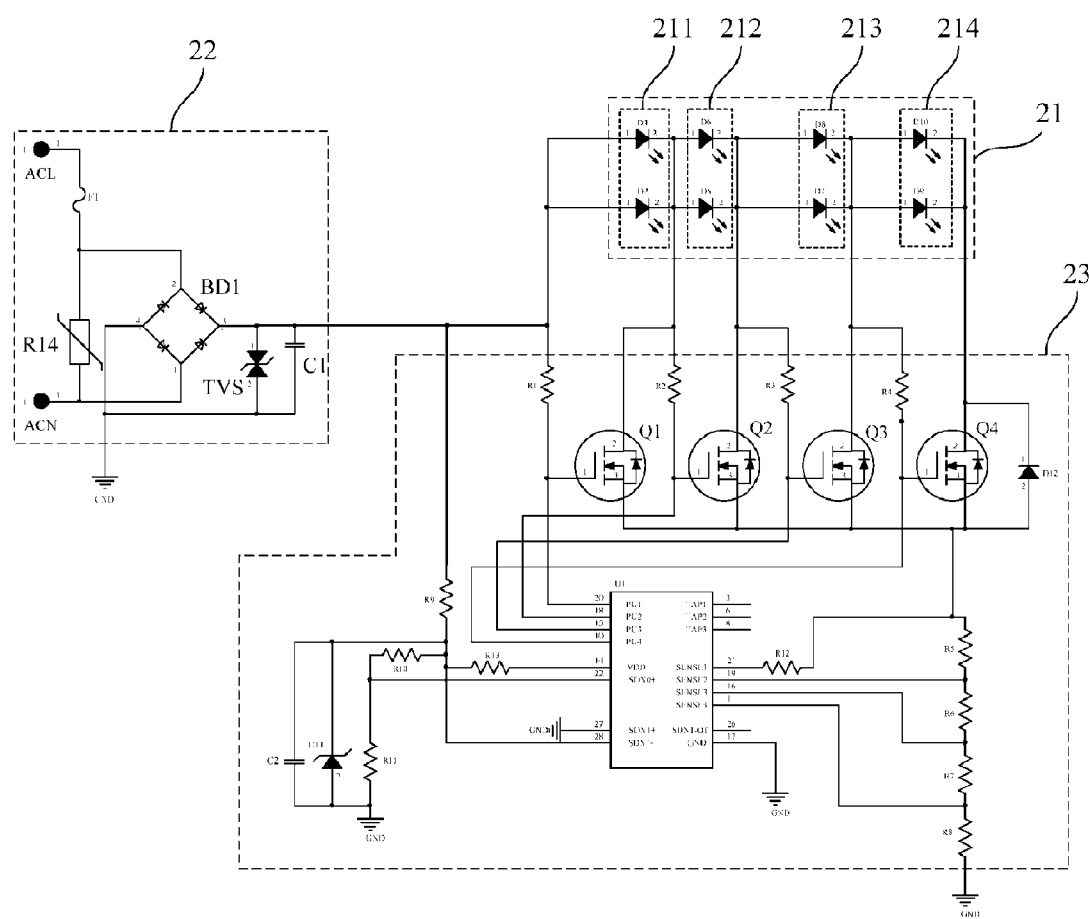
FIG. 3 is a schematic diagram showing an embodiment of a drive circuit of an LED module in accordance with the present invention.

Refer to FIG. 2 and FIG. 3. It should be noted that the drawings provided in this embodiment merely exemplarily illustrate basic ideas of the present invention, and therefore the drawings merely show components related to the present invention rather than drawing according to the number, shape, and size of the components during an actual implementation. The pattern, quantity, and proportion of the components during an actual implementation may be randomly changed and the layout of the components may also be more complicated.

Refer to FIG. 2 and FIG. 3, FIG. 2 is a schematic diagram of a principle of a drive circuit of an LED module in accordance with the present invention, and FIG. 3 is a schematic diagram showing an embodiment of a drive circuit of an LED module in accordance with the present invention. As shown in FIG. 2 and FIG. 3, the present invention provides a drive circuit of an LED module, which at least comprises: an LED array 21, a power supply module 22, and a control module 23.

The LED array 21 comprises a plurality of parallel groups formed by a plurality of LEDs connected in parallel, where the parallel groups are connected in series; power of each LED in the LED array 21 is 1 W-4 W. In this embodiment, an LED whose power is preferably 1.5 W is used as an example for illustration. The plurality of LEDs is connected in parallel to form four parallel groups, namely a first parallel group 211, a second parallel group 212, a third parallel group 213, and a fourth parallel group 214 that are successively connected in series. In a specific example, the LED array 21 is a rectangular array 21 arranged by a plurality of singly packaged LEDs or a plurality of LEDs packaged by LED chips on board (COB), and the LED array 21 may also be a square, a rectangular, a circular, or an elongated array.

The power supply module 22 is connected to an external AC (or DC power supply) and the LED array 21, and used for converting the external power supply into a 12V-75V forward voltage that drives each LED in the LED array 21, so as to drive each LED to be turned on. In this embodiment, the power supply module 22 is directly connected to AC main power, for example, a 220V AC power supply generally used in China, a 230V AC power supply generally used in Europe, a 110V AC power supply generally used in North America, or a 277V AC power supply generally used in other regions.

In this embodiment, referring to a specific circuit of the power supply module 22 shown in FIG. 3, the power supply module 22 is connected to both ends of the AC power supply, and comprises a DB bridge DB1, a varistor R14, a TVS diode TVS, and a capacitor C, wherein, a first end and a second end of the DB bridge are respectively connected to a null wire of the AC power supply (ACN) and a live wire of the AC power supply (ACL), a third end of the DB bridge is grounded, and a fourth end is connected to the LED array 21 and the control module 23; the varistor is connected between the first end and the second end of the DB bridge; the TVS diode is connected between the third end and the fourth end of the DB bridge; and the capacitor is connected between the third end and the fourth end of the DB bridge.

The control module 23 is connected between the power supply module 22 and the LED array 21 and comprises a plurality of gating switches and a control unit 231, where the gating switches are disposed corresponding to the parallel groups and used for conducting or cutting off power supply loops of the parallel groups, and the control unit 231 is used for controlling the gating switches to perform a conduction or cutoff operation according to a detected input voltage.

In this embodiment, a first gating switch, a second gating switch, a third gating switch, and a fourth gating switch corresponding to the first parallel group 211, the second parallel group 212, the third parallel group 213, and the fourth parallel group 214 are disposed in the control module 23.

In this embodiment, the control module 23 further comprises a setting unit 232 and a detection unit 233. The setting unit 232 is used for presetting a first voltage threshold, a second voltage threshold, a third voltage threshold and a fourth voltage threshold. The detection unit 233 is connected to the power supply module 22 and the setting unit 232, and is used for detecting a value of a forward voltage outputted by the power supply module 22. The detection unit 233 sends an instruction to the control unit 231 to instruct the control unit 231 to control the first gating switch to be turned on, when detecting that the value of the forward voltage reaches the first voltage threshold; sends an instruction to the control unit 231 to instruct the control unit 231 to control the first gating switch and the second gating switch to be turned on, when detecting that the value of the forward voltage reaches the second voltage threshold; sends an instruction to the control unit 231 to instruct the control unit 231 to control the first gating switch, the second gating switch and the third gating switch to be turned on, when detecting that the value of the forward voltage reaches the third voltage threshold; and sends an instruction to the control unit 231 to instruct the control unit 231 to control the first gating switch, the second gating switch, the third gating switch and the fourth gating switch to be turned on.

In an actual application example, the control unit 231, for example, is a control chip comprising a peripheral circuit thereof, and the first gating switch, the second gating switch, the third gating switch, and the fourth gating switch are a transistor Q1, a transistor Q2, a transistor Q3, and a transistor Q4 respectively.

In the example shown in FIG. 3, the four gating switches, which are the transistor Q1, the transistor Q2, the transistor Q3, and the transistor Q4 respectively, can divide a drive voltage inputted to the LED array 21 into four stages to take control. When the detection unit 233 detects that the drive voltage inputted to the LED array 21 reaches a first-stage LED voltage (that is, detects that the value of the forward voltage reaches the first voltage threshold), the control unit 231 makes the transistor Q1 turned on and grounded, so that the first parallel group 211 is conducted to the ground; when the detection unit 233 detects that the drive voltage inputted to the LED array 21 reaches a second-stage LED voltage (that is, detects that the value of the forward voltage reaches a second voltage threshold), the control unit 231 makes the transistor Q1 turned off and the transistor Q2 turned on and grounded, so that the first parallel group 211 and the second parallel group 212 are conducted to the ground; when the detection unit 233 detects that the drive voltage inputted to the LED array 21 reaches a third-stage LED voltage (that is, detects that the value of the forward voltage reaches a third voltage threshold), the control unit 231 makes the transistor Q1 and the transistor Q2 turned off and the transistor Q3 turned on and grounded, so that the first parallel group 211, the second parallel group 212 and the third parallel group 213 are conducted to the ground; and when the detection unit 233 detects that the drive voltage inputted to the LED array 21 reaches a fourth-stage LED voltage (that is, detects that the value of the forward voltage reaches a fourth voltage threshold), the control unit 231 makes the transistor Q1, the transistor Q2 and the transistor Q3 turned off and the transistor Q4 turned on and grounded, so that the first parallel group 211, the second parallel group 212, the third parallel group 213 and the fourth parallel group 214 are conducted to the ground at the same time. By means of this control manner, the efficiency and the power factor of the power supply can be improved.

As can be know from the above description, currents flowing through the different LEDs are the same rather than having four values. If there is a strict requirement on color reliability, this method can eliminate wavelength conversion caused by a current change (which is an inherent feature of the LED). Another advantage of this method is that a forward voltage can be reduced when a current is small, thereby reducing the loss of a current source.

In summary, a line voltage of an LED in accordance with the present invention can synchronize with an input voltage of a power supply, and when a switch controls the LED to be turned on or turned off, a current reference value of the LED also correspondingly changes as the voltage of the power supply changes. In this way, two effects are achieved: low power consumption (because a small voltage difference exists between two different LEDs) and a large power factor (the current follows the voltage) are obtained; and furthermore, each LED in the LEDs connected in parallel can evenly shunt the current flowing through them and this method can substantially improve the luminous efficiency. The solution in accordance with the present invention can provide regular AC power for the LED array, without the need of providing a capacitor. The solution further overcomes design defects of a DC solution, optimizes the performance of a light bulb, and reduces a manufacturing cost of the light bulb. Compared with other lighting technologies, the AC solution reduces a total arrangement cost of the LED. Therefore, the present invention effectively overcomes the defects in the prior art and has a high industrial utilization value.

The foregoing embodiment is merely for the purpose of exemplarily describing the principles and effects of the present invention, but is not intended to limit the present invention. Any person skilled in the art can make modifications or variations to the foregoing embodiment without departing from the spirit and the scope of the present invention. Thus, all equivalent modifications or variations made by a person of ordinary skill in the art without departing from the spirit and technical concepts disclosed in the present invention shall fall within the claims of the present invention.

What is claimed is:

1. A drive circuit of an LED module, wherein the drive circuit at least comprises:
   an LED array, comprising a plurality of parallel groups formed by a plurality of LEDs connected in parallel, where the parallel groups are connected in series;
   a power supply module, connected to an external AC or DC power supply and the LED array, and used for converting the external power supply into a 12V-75V forward voltage that drives each LED in the LED array; and
   a control module, connected between the power supply module and the LED array, and comprising a plurality of gating switches, a plurality of current-limiting resistance connected with corresponding gating switches in series respectively, and a control unit, where the gating switches are disposed corresponding to the parallel groups and used for conducting or cutting off power supply loops of the parallel groups, and the control unit is used for controlling the gating switches to perform a conduction or cutoff operation according to a detected input voltage;
   the power supply module is connected to both ends of the AC power supply, and comprises a DB bridge, a varistor, a TVS diode, and a capacitor, wherein a first end and a second end of the DB bridge are respectively connected to a null wire of the AC power supply and a live wire of the AC power supply, a third end of the DB bridge is grounded, and a fourth end is connected to the LED array and the control module; the varistor is connected between the first end and the second end of the DB bridge; the TVS diode is connected between the third end and the fourth end of the DB bridge; and the capacitor is connected between the third end and the fourth end of the DB bridge.

2. The drive circuit of an LED module as in claim 1, wherein the power of each LED in the LED array is 1 W-4 W.

3. The drive circuit of an LED module as in claim 1, wherein the AC power supply connected to the power supply module is a 220V AC power supply, a 230V AC power supply, a 277V AC power supply, or a 110V AC power supply.

4. The drive circuit of an LED module as in claim 1, wherein the LED array comprises a first parallel group, a second parallel group, a third parallel group and a fourth parallel group that are successively connected in series.

5. The drive circuit of an LED module as in claim 4, wherein a first gating switch, a second gating switch, a third gating switch and a fourth gating switch corresponding to the first parallel group, the second parallel group, the third parallel group and the fourth parallel group are disposed in the control module.

6. The drive circuit of an LED module as in claim 5, wherein the control module further comprises:
   a setting unit, used for presetting a first voltage threshold, a second voltage threshold, a third voltage threshold and a fourth voltage threshold; and
   a detection unit, connected to the power supply module, and used for detecting a value of a forward voltage outputted by the power supply module, sending an instruction to the control unit to instruct the control unit to control the first gating switch to be turned on, when detecting that the value of the forward voltage reaches the first voltage threshold; sending an instruction to the control unit to instruct the control unit to control the first gating switch and the second gating switch to be turned on, when detecting that the value of the forward voltage reaches the second voltage threshold; sending an instruction to the control unit to instruct the control unit to control the first gating switch, the second gating switch and the third gating switch to be turned on, when detecting that the value of the forward voltage reaches the third voltage threshold; and sending an instruction to the control unit to instruct the control unit to control the first gating switch, the second gating switch, the third gating switch, and the fourth gating switch to be turned on.

* * * * *